Figure 1:
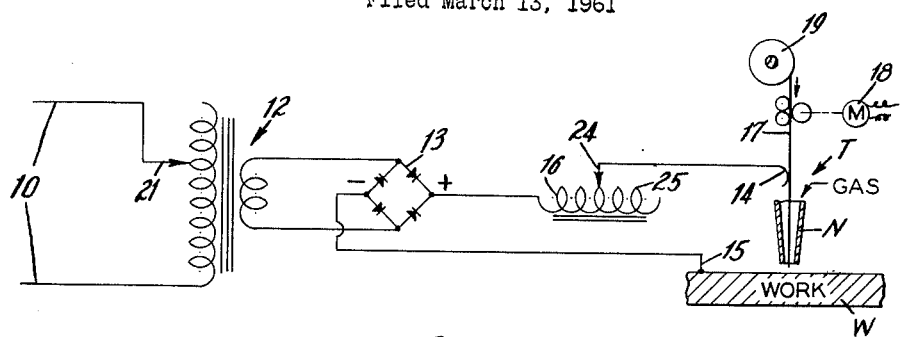

Nov. 24, 1964     A. F. MANZ     3,158,734

GAS SHIELDED-METAL ARC WELDING

Filed March 13, 1961

INVENTOR.
AUGUST F. MANZ
BY Barnwell R. King
ATTORNEY

United States Patent Office 3,158,734
Patented Nov. 24, 1964

3,158,734
GAS SHIELDED-METAL ARC WELDING
August F. Manz, Newark, N.J., assignor to Union Carbide Corporation, a corporation of New York
Filed Mar. 13, 1961, Ser. No. 95,158
6 Claims. (Cl. 219—131)

This invention relates to sigma, i.e., gas-shielded metal arc-welding, and more particularly to work-in-circuit short-circuiting type consumable electrode-metal transfer sigma welding power supply systems.

Short-circuiting type metal transfer sigma welding is discussed in detail by Tuthill et al. in Patent No. 2,886,696, dated May 12, 1959. Heretofore, rectified alternating current as used for short-circuiting type metal transfer, has usually been supplied by a three-phase alternating current source. Such polyphase power is adequate for short-circuiting type metal transfer. When only single-phase power is generally available, however, many welding applications involving such type of metal transfer cannot be performed.

Prior commercially available single-phase rectifier-type power sources have not proven themselves as entirely adequate for such use. They exhibit erratic arcing characteristics, which produce undesirable spatter and non-uniform weld bead configuration. This is due to too high or too low short-circuiting current and/or too fast or too slow a change from non-short-circuiting current to short-circuiting current.

The main object of the invention is to provide novel circuit means for obtaining a controlled short-circuiting current for short-circuiting type metal transfer from an alternating current source, which overcomes such problems.

Such object is accomplished according to the present invention, in the provision of a novel sigma welding power supply system for short-circuiting type metal transfer between an electrode wire and the work toward which such wire is fed in circuit therewith. Such system comprises a transformer having a single phase A.C. input circuit, and a full wave single-phase rectifier the input circuit of which is connected to the output circuit of said transformer. The D.C. output circuit of said rectifier is connected directly to the input circuit of a short-circuiting type sigma welding set-up. The rectifier output circuit contains a series connected filter choke, the inductance of which is selected to smooth the welding current wave form and provide adequate speed of response under short-circuiting sigma welding conditions.

The transformer comprises means for adjusting the open circuit output voltage thereof through a range of 10 to 30 volts, inclusive, in increments of no greater than 0.5 volt each, to yield suitable operator control over the welding operation. Each of resulting characteristics is such that undesirable spatter and erratic arc action are minimized by virtue of the fact that such characteristics has a minimum short-circuit current of $I_M = (400 \pi r S)^{1/2}$ in which $r$=radius of the welding wire electrode, and $S$=surface tension of the molten metal transferred from such wire to the work being welded.

Figure 2:
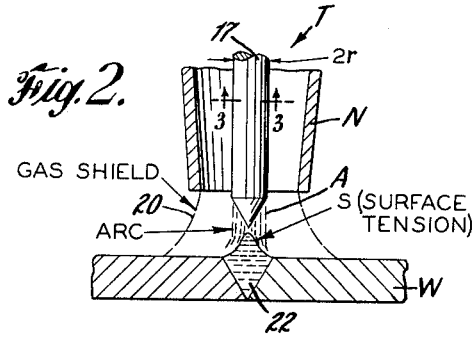
Figure 3:
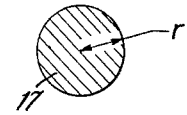
Figure 4:
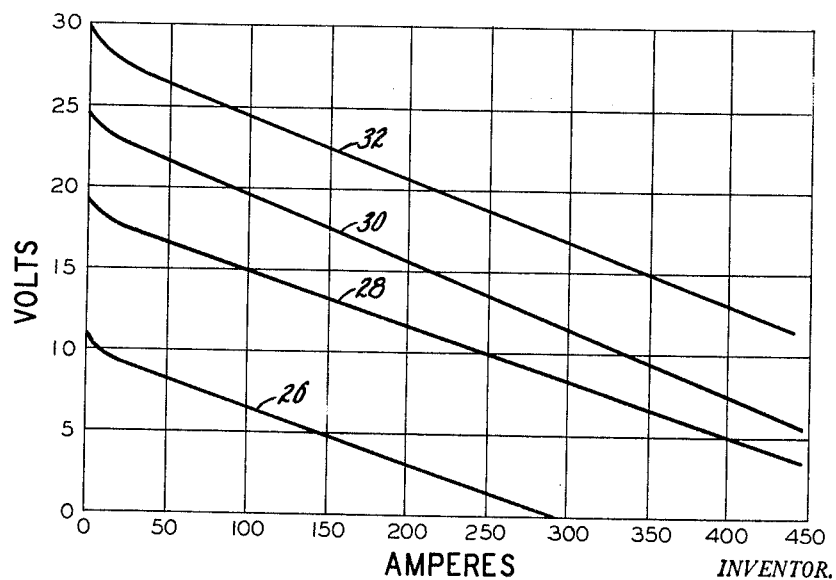

In the drawings:

FIG. 1 is a circuit diagram illustrating the invention;
FIG. 2 is a fragmentary sectional view of the torch being used to weld a seam in work;
FIG. 3 is an enlarged view in cross-section of the electrode wire; and
FIG. 4 is a graphical representation of V-A characteristic curves for several, but not all adjustments of the transformer.

A power supply circuit satisfying requirements for producing optimum short-circuiting type metal transfer operating with a single-phase input is shown in FIG. 1. A single-phase A.C. input 10 provides a source of power for a main transformer 12 which transforms the single-phase A.C. input voltage to a level suitable for acceptance by a full-wave single-phase rectifier 13 whose direct current output is delivered to terminals 14 and 15 through an adjustable rectifier filter choke 16.

Such terminals 14 and 15 are electrically connected to work W to be welded, and to a sigma welding torch or gun T, respectively, for energizing a welding arc A between a wire electrode 17 and such work W, as such electrode is fed through the torch T by a wire feed motor 18 from a supply reel 19. The torch T includes a gas cup or nozzle N surrounding the electrode 17 in spaced relation for discharging a stream 20 of selected shielding gas toward the work W and around the arc A to protect the welding operation from atmospheric contamination.

In order to control the arc A, the primary of main transformer 12 has an adjustable member 21 providing an open-circuit secondary voltage with a range of at least from 10 to 30 volts in increments of not greater than 0.5 volt, but preferably 0.2 volt or less. The 0.5 volt value corresponds to the upper limit of variation of welding voltage adjustment allowable to yield suitable operator control over weld 22. The 0.2 voltage value represents the voltage fluctuation in the output voltage that is inherent to the normally available input line voltage fluctuation.

When the input voltage is more closely regulated, the fluctuation in the output voltage is lessened, therefore, the power supply can be made to permit finer adjustment, if desired.

The main transformer 12, in combination with rectifier 13 and filter choke 16, due to their inherent characteristics, control the regulation characteristic (slope) of the output. The volt/ampere output characteristic, when measured at terminals 14 and 15, respectively, is determined for the minimum open-circuit voltage of the power supply by a minimum short-circuit current defined by the following equation:

(1) $$I_M = (400 \pi r S)^{1/2}$$

Where:

$I_M$=the short-circuit current across the output terminals 14, 15
$r$=An equivalent radius for the electrode 17 (centimeters)
$S$=the surface tension of the molten electrode (dynes/cm.)

This is derived by equating the electro-magnetic pinch force $F_p$ to the surface tension force $F_t$. For the case of a cylindrical conductor, the pinch force (see electromagnetic problems in Electrical Engineering, I. B. Hague, Oxford University Press, 1929, pages 345–350).

(2) $$F_p = I^2/200 + I^2 \ln (r_1/r_2)/100$$

Where:

$I$=the circuit current, and $r_1$ and $r_2$ respectively=the radius of the wire directly above, and at the narrowest point of the constriction in the conductor.

For the case of a cylindrical conductor, the surface tension force (3) $$F_t = 2\pi r S$$

Where:

$r$=the radius of the cylinder in centimeters
$S$=the surface tension in dynes per centimeter.

Equating the first term of Equations 2 and 3, and then solving for the current I, which in this specific case is the same as $I_M$, yields Equation 1.

The value of $I_M$ represents the minimum short-circuit current necessary for consistent weld results.

The table below indicates typical values for wires of 0.04 centimeter in radius:

*Table I*

| Material | Temperature, °C. | S (dynes/cm.) | Min. Short-Circuit Current |
|---|---|---|---|
| Aluminum | 750 | 520 | 162 |
| Steel | 1,570 | 1,700 | 293 |

From Table I, for a given wire electrode radius, the minimum value of short-circuit current which the power source supplies, according to the invention, is determined by the maximum value of current $I_M$ for the materials to be welded. If this requirement is met, there exists sufficient current to create consistent short-circuiting metal transfer for all the materials to be welded.

Also apparent from Table I is that a power source capable of being used for welding both aluminum and steel electrode wires of 0.04 cm. radius would require a short-circuit current of no less than 293 amperes or approximately 300 amperes at any output voltage.

For a power supply with a fixed regulation (volt/ampere slope) characteristic, and a variable open-circuit voltage, the invention provides for a short-circuit current I at the lowest open-circuit voltage in order to meet the minimum requirements at all higher open-circuit voltages. A power source with a variable regulation characteristic (volt/ampere slope) provides the minimum short-circuit current $I_M$ at all open circuit voltages.

For example, with a fixed regulation characteristic and an open-circuit of 10 volts and $I_M=300$ amperes, the regulation characteristic is equal to 3.3 volts per 100 amperes. At 30 volts open-circuit, such fixed regulation characteristic would result in $I_M=900$ amperes. Hence, the maximum value of "I" is established irrespective of the basic equation and fulfills the minimum requirements of Table I.

For a power supply with a variable volt-ampere characteristic, and open-circuit of 30 volts, and $I=300$ amperes, the volt/ampere characteristic slope is equal to 10 volts/100 amperes. At the same volt/ampere characteristic, and an open-circuit of 10 volts, the resulting current is equal to 100 amperes, and does not fulfill the minimum requirements of Table I. Therefore, it is necessary to adjust the variable volt/ampere characteristic to a value which satisfies the requirements of Table I.

A power source with a fixed regulation characteristic (slope) according to the invention exhibits output characteristics as shown in FIG. 4. Such power source provides a short-circuit current $I_M=300$ amperes at 10 volts open-circuit, as shown by curve 26. Consequently, the requirements of $I_M$ are met at such minimum open-circuit voltage and all other open-circuit voltages, depending upon the adjustment of tap 21, FIG. 1, as shown by curves 28, 30, 32, and 36, for example.

Filter choke 16, in addition to its function of smoothing the current wave form, provides an adequate speed of response for the system. For a power source with the output characteristics, as shown in FIG. 4, the value of the filter choke 16 may vary between 100 and 500 microhenries. Variation or adjustment of inductance is accomplished by a selector slide 24 in combination a series of taps 25. When only one value of inductance is desired, 275 microhenries is preferable over a wide range of operating conditions.

Fillet welds made on aluminum and steel, respectively, obtained with the power supply whose characteristics are shown in FIG. 4 resulted in good bead and weld surface appearance with little or no weld spatter.

The invention provides a D.C. electric welding power source for short-circuiting type metal transfer which operates from a single-phase A.C. source of power, the characteristics of such D.C. source being such that the undesirable spatter and erratic arc action are minimized. The open-circuit voltage thereof is adjustable in increments of no greater than 0.5 volt, but preferably less than 0.2 volt from 10 to 30 volts open-circuit and has an output regulation characteristic (volt/ampere slope) as determined by:

$$I_M = (400\pi rS)^{1/2}$$

What is claimed is:

1. A welding power supply system for short-circuiting type metal transfer between an electrode wire and the work toward which such wire is fed in circuit therewith, comprising a transformer having an A.C. input circuit, a full wave rectifier the input circuit of which is connected by means of a relatively low impedance circuit to the output circuit of said transformer, the D.C. output circuit of said rectifier being adapted to be connected directly to the input circuit of a sigma welding set-up, said rectifier output circuit containing a series connected filter choke the inductance of which is selected to smooth the welding current wave form and provide adequate speed of response under short-circuiting sigma welding conditions, said transformer comprising preselectable means for adjusting the open circuit output voltage thereof through a range of 10 to 30 volts, inclusive, in increments no greater than 0.5 volt each to yield suitable operator control over the welding operation, the resulting characteristic being such that undesirable spatter and erratic arc action are minimized by virtue of the fact that such characteristic has a minimum short-circuit current of $I_M = (400\pi rS)^{1/2}$ in which $r$=radius of the wire electrode, and $S$=surface tension of the molten metal transferred from such wire to the work to thereby minimize objectionable spatter of the so-transferred molten metal.

2. A welding power supply system, as defined by claim 1, in which such increments are less than 0.2 volt each.

3. A welding power supply system, as defined by claim 2, in which such inductance has a value of between 100 and 500 microhenries.

4. In a short-circuiting type welding apparatus, the combination with a D.C. welding circuit including the work and a wire electrode, of circuit means for energizing said D.C. welding circuit with D.C. power derived from a single-phase A.C. source, comprising a transformer and means for adjusting the single-phase A.C. output voltage of said transformer to change the D.C. voltage through a range of 10 to 30 volts in increments of not more than 0.5 volt, and a full-wave rectifier connected to be energized by the A.C. output of said transformer, said D.C. circuit being energized by said rectifier through an adjustable tap series-connected filter choke, the fixed volt/ampere characteristic of the welding power supplied to said D.C. welding circuit at any selected output voltage obtained through adjustment of said means having a minimum short-circuit current of $I_M=(400\pi rS)^{1/2}$ in which $r$=radius of the wire electrode, and $S$=surface tension of the molten metal transferred from such wire to the work to thereby minimize objectionable spatter of the so-transferred molten metal.

5. In consumable metal arc welding apparatus, the combination with a D.C. welding circuit including the work and a metal electrode, of circuit means for energizing said D.C. welding circuit with D.C. power comprising means for adjusting the output voltage of said circuit means to change the D.C. voltage through a suitable welding range, said D.C. circuit being energized through an adjustable series-connected filter choke, the fixed volt/ampere characteristic of the welding power supplied to said D.C. welding circuit at any selected output voltage obtained through adjustment of said adjustable means having a minimum short-circuit current of $$I_M = (400\pi r S)^{1/2}$$

in which $r$=radius of the wire electrode, and $S$=surface tension of the molten metal transferred from such wire to the work to thereby minimize objectionable spatter of the so-transferred molten metal.

6. In consumable metal arc welding apparatus, the combination with a D.C. welding circuit including the work and a metal electrode, of circuit means for energizing said D.C. welding circuit with D.C. power, comprising a series-connected filter choke, the fixed volt/ampere characteristic of the welding power supplied to said D.C. welding circuit by said circuit means having a minimum short-circuit current of $I_M = (400\pi r S)^{1/2}$ in which $r$=radius of the wire electrode, and $S$=surface tension of the molten metal transferred from such wire to the work to thereby minimize objectionable spatter of the so-transferred molten metal.

References Cited in the file of this patent

UNITED STATES PATENTS

| | | |
|---|---|---|
| 2,777,973 | Steele et al. | Jan. 15, 1957 |
| 2,825,004 | Rebuffoni | Feb. 25, 1958 |
| 2,873,356 | Carroll et al. | Feb. 10, 1959 |
| 3,026,407 | Bergmann | Mar. 20, 1962 |
| 3,054,884 | Manz et al. | Sept. 18, 1962 |
| 3,059,164 | Johnson | Oct. 16, 1962 |

FOREIGN PATENTS

| | | |
|---|---|---|
| 767,688 | Great Britain | Feb. 6, 1957 |